United States Patent [19]
Von Hardenberg et al.

[11] 3,836,100
[45] Sept. 17, 1974

[54] ENGINE MOUNTING ARRANGEMENT

[75] Inventors: Paul Warren Von Hardenberg, Huntington; George Anthony Molnar, Milford, both of Conn.

[73] Assignee: United Aircraft Corporation, East Hartford, Conn.

[22] Filed: June 13, 1973

[21] Appl. No.: 369,692

[52] U.S. Cl. ............... 244/54, 244/17.27, 248/2, 248/5, 248/15, 248/20
[51] Int. Cl. .............. B64d 27/20, B64d 27/26
[58] Field of Search .......... 244/54, 17.27, 17.11; 248/5, 15, 2, 20; 60/39.31

[56] References Cited
UNITED STATES PATENTS

| | | | |
|---|---|---|---|
| 2,380,274 | 7/1945 | Trott | 248/5 X |
| 2,753,140 | 7/1956 | Hasbrouck et al. | 248/5 |
| 2,936,978 | 5/1960 | Lauck | 248/5 |
| 3,056,569 | 10/1962 | Bligard | 248/5 |
| 3,217,490 | 11/1965 | Chilvers | 244/54 X |
| 3,288,404 | 11/1966 | Schmidt et al. | 248/5 |

*Primary Examiner*—Trygve M. Blix
*Assistant Examiner*—Paul E. Sauberer
*Attorney, Agent, or Firm*—Russell M. Lipes, Jr.

[57] ABSTRACT

Aircraft engine mounting arrangement in which a rear lower mount has near zero lateral restraint and an elastic vertical restraint and rear upper mount has near zero vertical restraint and an elastic lateral restraint, and an imaginary straight line drawn through the horizontal line of restraint for the front mounting and the rear upper mount locations will pass through the engine installation center of gravity to uncouple engine roll response from airframe lateral input motions.

11 Claims, 4 Drawing Figures

ENGINE MOUNTING ARRANGEMENT

BACKGROUND OF THE INVENTION

1. Field of the Invention

This invention relates to an aircraft engine mounting arrangement and more particularly to a helicopter engine mounting which isolates the roll response of the engine from lateral input motions from the helicopter airframe.

2. Description of the Prior Art

Typical helicopter engine installations involve having both the vertical and lateral isolator for the engine rear mounting attached to a lower portion of the engine. A helicopter engine installation providing longitudinal, vertical and lateral isolation is disclosed in Schmidt et al. U.S. Pat. No. 3,288,404. Further, airplane engine mountings have employed an arrangement in which the front and rear mountings are located on an imaginary line passing through the center of percussion or center of mass of an engine. Julien et al. APC publication No. 288,972 and Trott U.S. Pat. No. 2,380,274 disclose such arrangements.

In the performance of certain missions by a helicopter, severe vibration levels of the airframe are encountered. In the typical installation of an engine on a helicopter, the engine is mounted along its lower portion on structure extending from the airframe and lateral motions are imparted to the engine from the airframe. These motions tend to move the engine sideways and because of a coupling effect to roll the engine. There is a need for an engine mounting arrangement which minimizes the effect of imparted vibrations.

SUMMARY OF THE INVENTION

An object of the present invention is to provide an improved helicopter airframe/engine isolation system.

Another object of the invention is to provide a helicopter engine mounting system which uncouples engine roll response from lateral input motions from the airframe.

Still another object of the invention is to provide for a helicopter engine mounting system a rear mounting comprising a lower rear mount with near zero lateral restraint and an elastic vertical restraint and an upper rear engine mount with near zero vertical restraint and an elastic lateral restraint, the horizontal line of restraint of the upper rear mount being located on an extension of an imaginary straight line running through the horizontal line of restraint of the front mounting and the center of gravity of the engine.

In accordance with the invention, an engine mounting arrangement for a helicopter is provided in which the rear mount has a vertical isolator portion having a near zero lateral spring rate and a lateral isolator portion having a near zero vertical spring rate, with the horizontal line of restraint of the lateral isolator portion being located on a straight line extending through the horizontal line of restraint of the front mounting and the center of gravity of the engine.

The foregoing and other objects, features and advantages of the invention become more apparent in the light of the following detailed description of a preferred embodiment thereof, as illustrated in the accompanying drawing.

DESCRIPTION OF A PREFERRED EMBODIMENT

Figure 1:
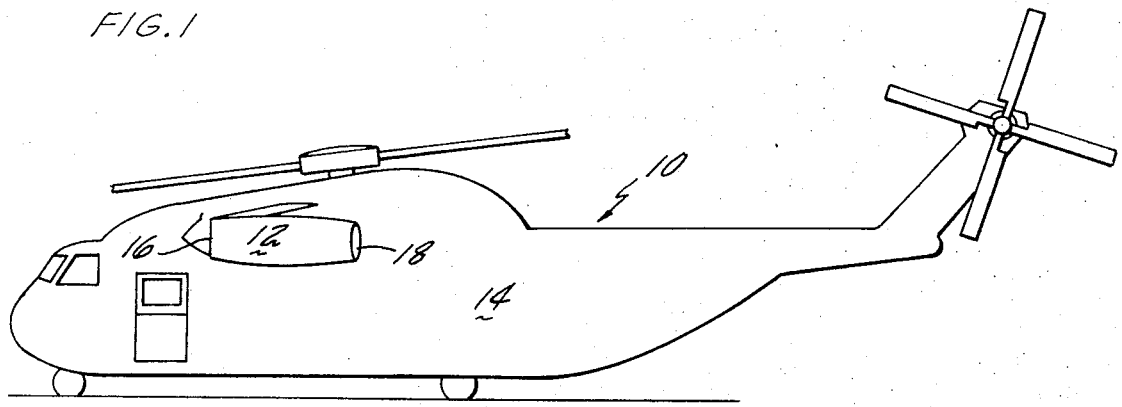
FIG. 1 is an outline drawing of a helicopter showing the relative location of an engine which is supported by the mounting arrangement of this invention.

Referring to FIG. 1, helicopter 10 is shown having an engine within compartment 12, the engine being suspended from fuselage 14 of the helicopter, the engine has a front mounting in the area adjacent inlet 16 to compartment 12 and a rear mounting adjacent compartment outlet 18.

Figure 2:
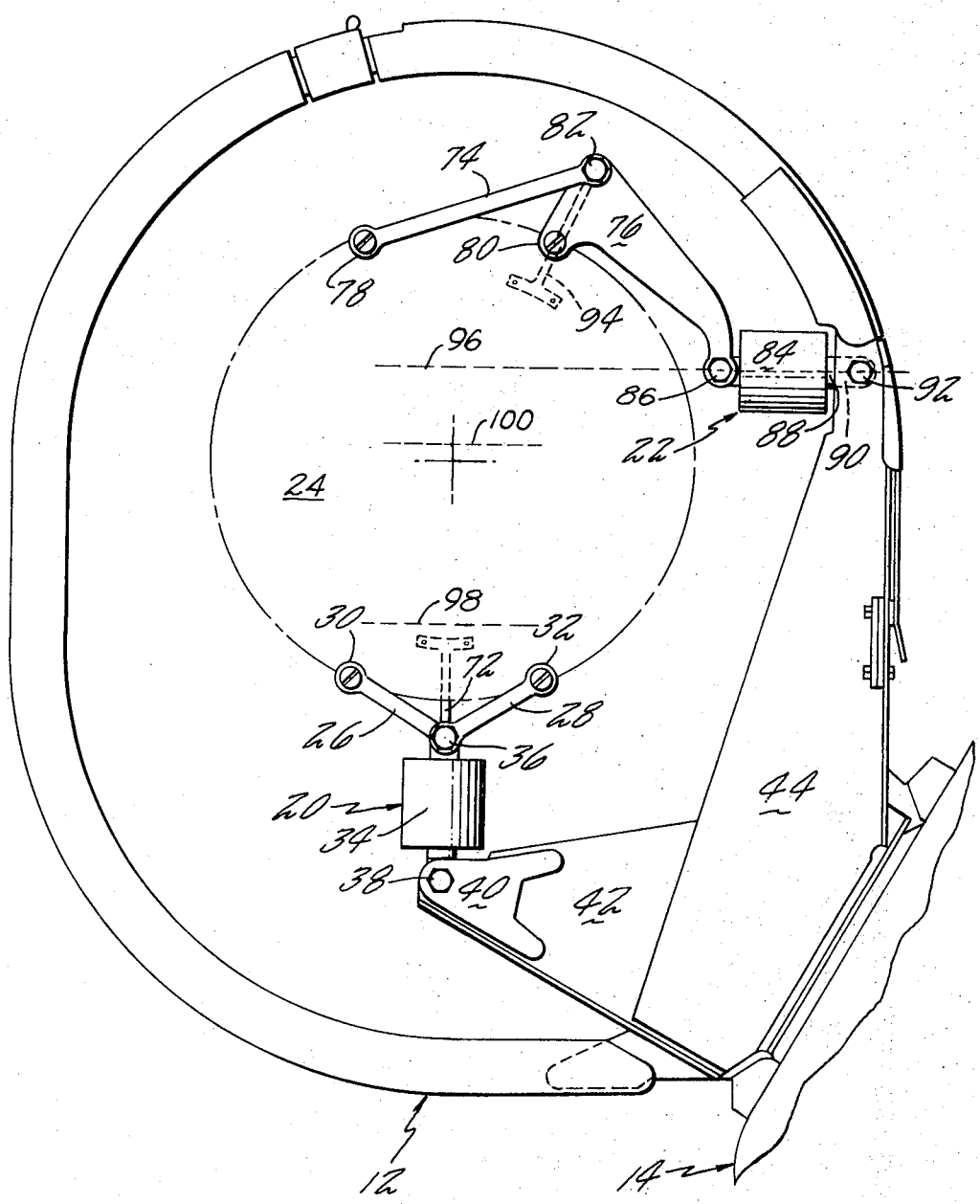
FIG. 2 is a section through the engine compartment of the helicopter, looking forward toward the rear mounting showing the upper and lower rear mounts.

FIG. 2 is a section through engine compartment 12 looking forward within the compartment toward the rear mounting. The rear mounting consists of a lower mount 20 and an upper mount 22 as will be explained. The mountings are attached to the casing of engine 24 shown in phantom.

Lower mount 20 includes a pair of links 26 and 28, one end of each link being directly connected as at 30 and 32 to the engine casing at the bottom of the engine and the other end of each link having a common pivotable connection with the upper end of isolator 34 at bolt 36 which is a spherical connection. The links extend tangentially from the engine casing. The isolator in turn is pivotably connected at its lower end by bolt 38, which also is a spherical connection, to bracket 40 which is fixedly connected to fuselage 14 by frame members 42 and 44.

Figure 3:
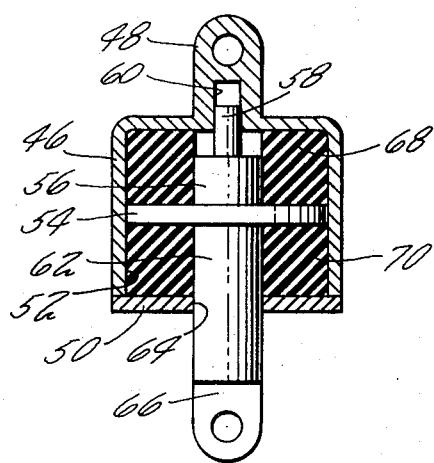
FIG. 3 is a schematic representation in section of one of the rear mounting vibration isolators.

Isolator 34 is shown schematically in FIG. 3 and its structure is old in the art. It is located directly below the centerline of engine 24. The isolator includes casing 46 having lug 48 projecting upward therefrom to which links 26 and 28 are connected by bolt 36 as shown in FIG. 2. Casing 46 has cover plate 50 which seals its lower end and which together with the casing defines chamber 52. Piston 54 fits within chamber 52. As shown, rod 56 extends from the upper surface of the piston and guide 58 of smaller diameter than the rod extends from the rod. The guide slides in base 60 within lug 48 and serves to pilot the motion of piston 54 within chamber 52. Rod 62 extends from the lower surface of piston 54 and projects through opening 64 in cover plate 50. The rod terminates in lug 66 which, as shown in FIG. 2, is pivotably connected by bolt 38 to bracket 40. Annular elastic rings 68 and 70 are mounted within chamber 52 on either side of piston 54. Elastic ring 68 surrounds rod 56 on the upper side of the piston and elastic ring 70 surrounds rod 62 on the lower side of the piston. Link 72 extends in a fore and aft direction between bolted connection 36 and the casing of engine 24 to support the mount structure. By virtue of the construction of isolator 34 and its connections with engine 24 and airframe 14, there is a minimum of lateral restraint and an elastic vertical restraint of engine 24 to minimize resulting engine vibration from vibratory inputs of the helicopter airframe.

Upper mount 22 includes link 74 and L-shaped link 76. One end of link 74 has connection 78 with engine 24 and one leg of L-shaped link 76 has connection 80 with the engine. The other end of link 74 is connected at 82 to L-shaped link 76, and the other end of L-shaped link 76 has a pivotable connection with the left end of isolator 84 at bolt 86 which is a spherical connection.

Isolator 84 is structured like isolator 34 and contains internally a piston having rod extension 88 terminating in lug 90 which is pivotably connected to frame member 44 by bolt 92 which is a spherical connection. Link 94 extends in a fore and aft direction between connection 82 and the casing of engine 24 to support the mount structure. By virtue of the construction of isolator 84 and its connections with engine 24 and airframe 14, there is a minimum of vertical restraint and an elastic lateral restraint of engine 24 to minimize resulting engine vibration from vibratory inputs of the helicopter airframe. Horizontal broken line 96 passing through the axis of bolt 92 represents the horizontal line of restraint for upper mount 22.

Figure 4:
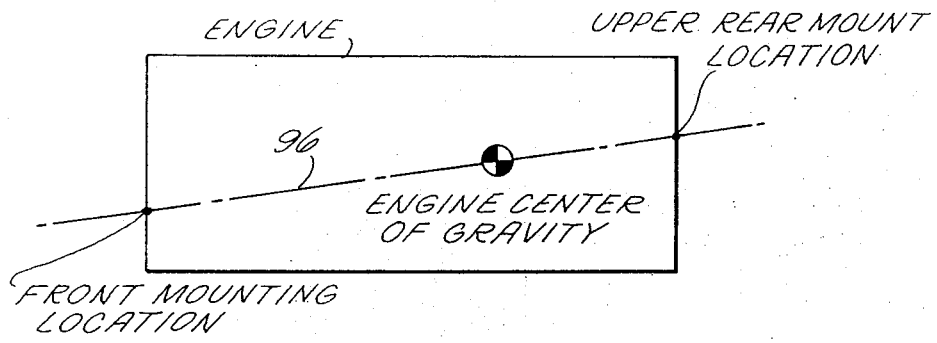
FIG. 4 is a simplified line showing of the relative location in a vertical plane of the front mounting and upper rear mount and the center of gravity of the engine.

THe relative vertical location of upper mount 22, that is the location of horizontal line 96 with respect to the engine and lower mount 20, is on an imaginary straight line extending through the horizontal line of restraint for the front mounting of the engine and the center of gravity of the engine. Horizontal broken line 98 in FIG. 2 is representative of the horizontal line of restraint for the front mount and horizontal broken line 100 is representative of the horizontal location of the center of gravity. The relationship is illustrated in FIG. 4 where on a vertical plane through the engine center of gravity the location of upper mount 22 is on straight line 96 passing through the center of gravity and the horizontal lines of restraint for the front mounting and the upper rear mount.

The mounting arrangement described above with its combination and construction of isolators and linkage connections and the relative location of the rear upper mount will tend to place lateral inputs resulting from vibratory motion of the helicopter fuselage at a point on a line drawn through the front mounting and the center of gravity of the engine. This will inhibit the introduction of fuselage-induced roll moments to the engine. With this decoupling of the engine roll mode from airframe excitation, the engine response should be well within the engine manufacturer's specified limit for virtually all flight conditions.

Although the invention has been shown and described with respect to a preferred embodiment thereof, it should be understood by those skilled in the art that the foregoing and other changes and variations in the form and detail thereof may be made therein without departing from the spirit and scope of the invention, which is to be limited and defined only as set forth in the following claims.

We claim:

1. An aircraft engine mounting arrangement including front and rear mountings;

said rear mounting including a lower mount having near zero lateral restraint and an elastic vertical restraint, and an upper mount having near zero vertical restraint and an elastic lateral restraint;

said upper mount being located vertically such that its horizontal line of restraint intersects an imaginary straight line passing through the horizontal line of restraint for said front mounting and the center of gravity of the engine.

2. An aircraft engine mounting arrangement in accordance with claim 1 in which the restraining device for the upper and lower mounts includes a vibration isolator.

3. An aircraft engine mounting arrangement in accordance with claim 2 in which the vibration isolator for the lower mount is vertically positioned and the vibration isolator for the upper mount is horizontally positioned.

4. An aircraft engine mounting arrangement in accordance with claim 3 in which the vibration isolators are each connected to the engine at two points.

5. An aircraft engine mounting arrangement in accordance with claim 2 in which one portion of each isolator is pivotably connected to the engine and another portion of each isolator is pivotably connected to the aircraft.

6. An aircraft engine mounting arrangement in accordance with claim 5 in which the pivotable connection of each isolator to the engine includes a pair of links.

7. An aircraft engine mounting arrangement in accordance with claim 2 in which the lower mount vibration isolator is located directly below the engine center line.

8. An aircraft engine mounting arrangement in accordance with claim 2 in which the lower vibration isolator is tangentially connected to the engine by a pair of links.

9. An engine mounting arrangement for a helicopter;

said mounting arrangement including front and rear mountings;

said rear mounting including lower and upper mounts;

said lower mount including a vibration isolator one portion of which is connected to the fuselage of said helicopter and another portion of which is connected to said engine;

said lower mount being directly below the center line of said engine and providing vertical stiffness and a near zero lateral spring rate;

and said upper mount being at the side of said engine and providing lateral stiffness and a near zero vertical spring rate.

10. An engine mounting arrangement for a helicopter in accordance with claim 9 in which the upper mount is located vertically such that its horizontal line of restraint intersects an imaginary line passing through the horizontal line of restraint for said front mounting and the center of gravity of the engine.

11. An engine mounting arrangement for a helicopter in accordance with claim 9 in which the connection of the lower mount isolator includes two links;

one end of each link having a common connection with said isolator;

and the other end of each link having a tangential connection with said engine.

* * * * *